US008006580B2

(12) United States Patent
Salice

(10) Patent No.: US 8,006,580 B2
(45) Date of Patent: Aug. 30, 2011

(54) LIFTING DEVICE FOR A TWO-LEAF FOLDING FLAP

(75) Inventor: Luciano Salice, Carimate (IT)

(73) Assignee: Arturo Salice S.p.A, Novedrate (como) (IT)

( * ) Notice: Subject to any disclaimer, the term of this patent is extended or adjusted under 35 U.S.C. 154(b) by 720 days.

(21) Appl. No.: 12/083,953

(22) PCT Filed: Jul. 3, 2007

(86) PCT No.: PCT/EP2007/005880
§ 371 (c)(1), (2), (4) Date: Apr. 22, 2008

(87) PCT Pub. No.: WO2008/040403
PCT Pub. Date: Apr. 10, 2008

(65) Prior Publication Data

US 2009/0139055 A1 Jun. 4, 2009

(30) Foreign Application Priority Data

Oct. 4, 2006 (DE) .................... 20 2006 015 190 U

(51) Int. Cl.
*F16H 21/44* (2006.01)

(52) U.S. Cl. ........................................................ 74/103

(58) Field of Classification Search .................. 74/99 R, 74/102, 103, 104, 105; 296/36, 181; 312/322, 312/323, 327, 328; 16/221, 235, 236, 237
See application file for complete search history.

(56) References Cited

U.S. PATENT DOCUMENTS

| | | | | |
|---|---|---|---|---|
| 6,141,832 | A * | 11/2000 | Salice | 16/366 |
| 6,877,830 | B2 * | 4/2005 | Salice | 312/327 |
| 7,168,477 | B2 * | 1/2007 | Salice | 160/213 |
| 7,240,974 | B2 * | 7/2007 | Hirtsiefer | 312/109 |
| 2008/0216289 | A1 * | 9/2008 | Salice | 16/366 |

FOREIGN PATENT DOCUMENTS

| | | |
|---|---|---|
| DE | 197 18 429 | 11/1998 |
| DE | 201 00 662 | 4/2001 |
| DE | 20 2005 000 423 | 3/2005 |
| DE | 20 2005 000 814 | 3/2005 |
| DE | 20 2005 016 405 | 1/2006 |
| WO | 2005/075781 | 8/2005 |

* cited by examiner

*Primary Examiner* — Vicky Johnson
(74) *Attorney, Agent, or Firm* — Dilworth & Barrese, LLP

(57) ABSTRACT

A lifting device is provided for a two-leaf folding flap whose upper leaf is hinged to a top wall or partition wall of a carcass around a horizontal first axis and whose lower leaf is pivotally connected to the upper leaf around a second axis parallel to the first axis. The lifting device has at least one two-armed lever which is pivotally mounted to a side carcass part around a horizontal pivot axis and whose longer arm is hingedly connected to the lower leaf, and at least one hinge arm which hingedly connects the leaves and is respectively fastened in hinge cups arranged in the leaves. The hinge arm is adjustable with respect to a hinge cup via a first eccentric device in one direction and via a second eccentric device in another direction perpendicular to the first direction.

20 Claims, 4 Drawing Sheets

LIFTING DEVICE FOR A TWO-LEAF FOLDING FLAP

BACKGROUND OF THE INVENTION

The invention relates to a lifting device for a two-leaf flap in accordance with the description herein.

A lifting device for a two-leaf folding flap is known from DE 201 00 662 U1 whose upper leaf is hinged to a top wall or partition wall of a cupboard around a horizontal first axis and whose lower leaf is pivotally connected to the upper leaf around a second axis parallel to the first axis. The lifting device comprises at least one two-armed lever which is pivotally mounted to a side carcass part around a horizontal pivot axis and whose longer arm is hingedly connected to the lower leaf. A compression spring member is furthermore present whose one end is pivotally connected to the carcass part and whose other end is pivotally connected to the shorter lever arm.

The known folding flap is opened in that a person grips a handle, which is not shown, but which is necessary and is connected to the lower leaf, with said handle having to have a specific spacing from the lower edge of the lower leaf.

There is a need to provide lifting devices of the aforesaid type which enable the opening of the folding flap by a simple pulling of the lower edge of the lower leaf without a handle having to be provided for this purpose.

Such a lifting apparatus for a two-leaf folding flap is known from the German utility model DE 20 2005 016 405 corresponding to the background features herein. Here, a lifting device for a two-leaf folding flap is described which has a hinge which is provided with a hinge cup which can be used at one of the leaves and with a hinge arm which can be fixed to the other leaf for the connection of the two leaves. In one of the embodiments shown in this utility model, the hinge arm is connected in both leaves to pins in the hinge cups respectively present in the leaves such that the two door leaves are pivotally connected to one another in a very compact and space-saving form. In another embodiment, the hinge arm is connected in a hinge cup to one of the leaves, on the one hand, and is connected to the other leaf in the form of a customary four-bar hinge, on the other hand. Due to the use of the customary four-bar hinge, adjustability in the three coordinate directions is possible so that the leaves are adjustable with respect to one another and with respect to the carcass of the piece of furniture in the three spatial coordinates by a corresponding adjustment. Such an adjustability in the different coordinate directions is not possible in the embodiment in which the hinge arm is supported at each end in a hinge cup.

SUMMARY OF THE INVENTION

It is therefore the object of the present invention to further develop a lifting device in accordance with this description such that hinges which are supported at each end in a hinge cup can be provided with adjustment means in two coordinate directions which, on the one hand, enable the lateral alignment of the leaves and the adjustment of the mutual spacing.

This object is solved in accordance with the invention by the combination of the features herein. The hinge arm can accordingly be adjusted with respect to one of the hinge cups via a first eccentric device in one direction and via a second eccentric device in another direction perpendicular to the first direction.

Special embodiments of the invention result from the description herein.

The hinge arm can accordingly be held with clearance on an intermediate plate via at least one pin such that it can be adjusted via the first eccentric device rotatably received in the intermediate plate. An intermediate plate is present between the hinge arm and the hinge cup to which it is fastened, said intermediate plate being displaceably guided perpendicular to the joint axis at the hinge cup and at which the hinge arm is displaceable parallel to the pivot axis, with the corresponding relative positions being able to be set, i.e. fixed, by the eccentric device or other fastening means.

The hinge arm can be adjustable, together with the intermediate plate, with respect to the hinge cup via a second eccentric device passing through said intermediate plate.

The intermediate plate can be longitudinally displaceably guided on a support plate in which the eccentric device is also rotatably held. This enables a separate insertion of the support plate in a hinge cup otherwise made as standard.

Alternatively, the intermediate place can also be longitudinally displaceably guided in the hinge cup in which the second eccentric device is also rotatably held. The support plate is omitted in this embodiment.

In accordance with a further preferred embodiment, the intermediate plate can have a narrow web part which is engaged over by the hinge arm partially made in U-shape in section.

At least one pin can be held in the web part such that it projects beyond the web part at both sides and can thereby displaceably receive the over-engaging hinge arm transversely to the web part.

The at least one pin can be provided with a fluting in its middle region for an easier assembly. The fluting of the pin can thus be inserted into the web part of the intermediate plate with friction locking.

BRIEF DESCRIPTION OF THE DRAWINGS

Further details, advantages and features of the invention result from the embodiments shown in the drawing. There are shown.

DESCRIPTION OF THE PREFERRED EMBODIMENTS

Figure 1:
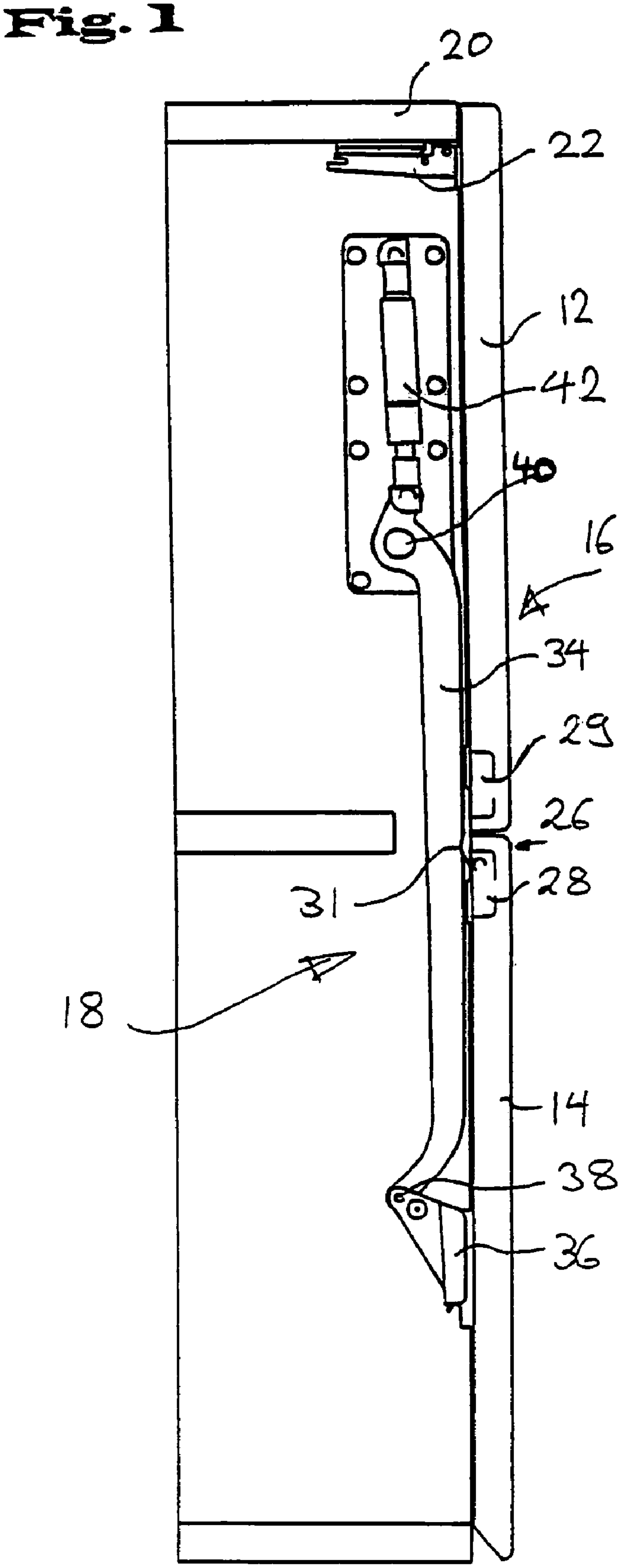
FIG. 1: a side view of an embodiment of the lifting device in accordance with the invention in a closed position of the folding flap connected thereto.

A side view of the carcass of the piece of furniture, i.e. e.g. of a closet or of a dresser element, can be seen from FIG. 1 whose opening is closed by a folding flap 16 comprising two leaves 12, 14 which are hingedly connected to one another. The front side wall has been removed in this representation to make the lifting device 18 for the folding flap visible. The upper leaf 12 of the folding flap 16 is hinged in the usual manner to the top wall 20 of the carcass by two two-bar hinges 22 so that said folding flap is pivotal around a joint axis defined by the hinges 20.

A lower leaf 14 is hingedly connected to the upper leaf 12 via a further hinge 26. A hinge cup 28 of the joint 26 is used in the lower leaf 14. A hinge cup 29 of the joint 26 is inserted in the upper leaf 12. The joint 26 defines a pivot axis around which the two leaves 12 and 14 of the folding flap are pivotable with respect to one another.

The lifting device 18 has a two-arm lever 34 in the manner already known from DE 201 00 662 U. The lever 34 forms a hinged point 38 with a fitting 36. The fitting is connected to the lower leaf 14, as can be seen from FIG. 1. The hinged point 38 likewise forms a horizontal pivot axis which is also designed by 38 for reasons of simplicity. A further pivot axis 40 is formed by the upper hinged point of the lever 34. A gas compression spring 42 whose free end is in turn hinged to the carcass engages at the shorter lever of the lever arm 34.

Figure 2:
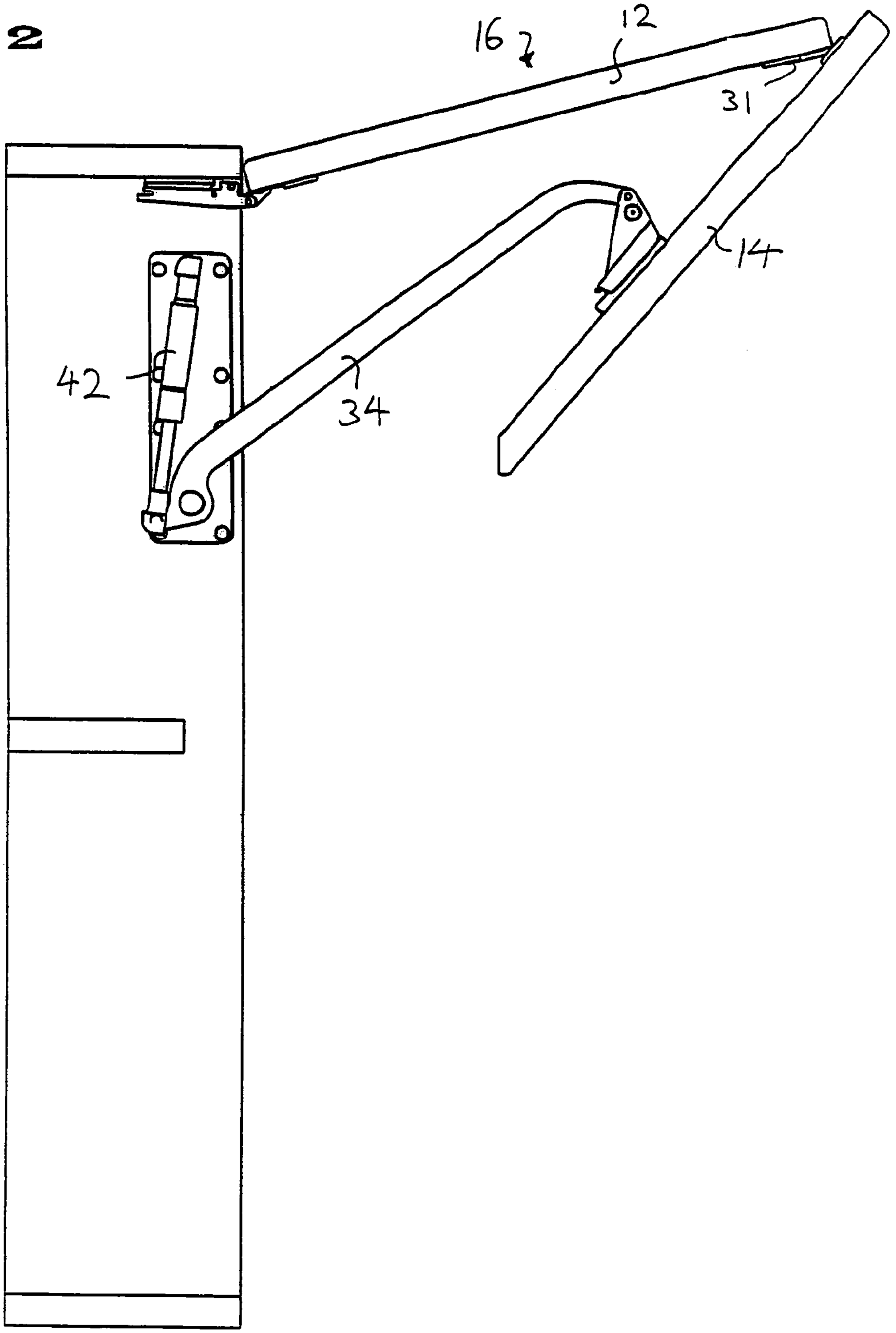
FIG. 2: a representation of the lifting device corresponding to FIG. 1 in which the folding flap is shown in an open position.
Figure 3:
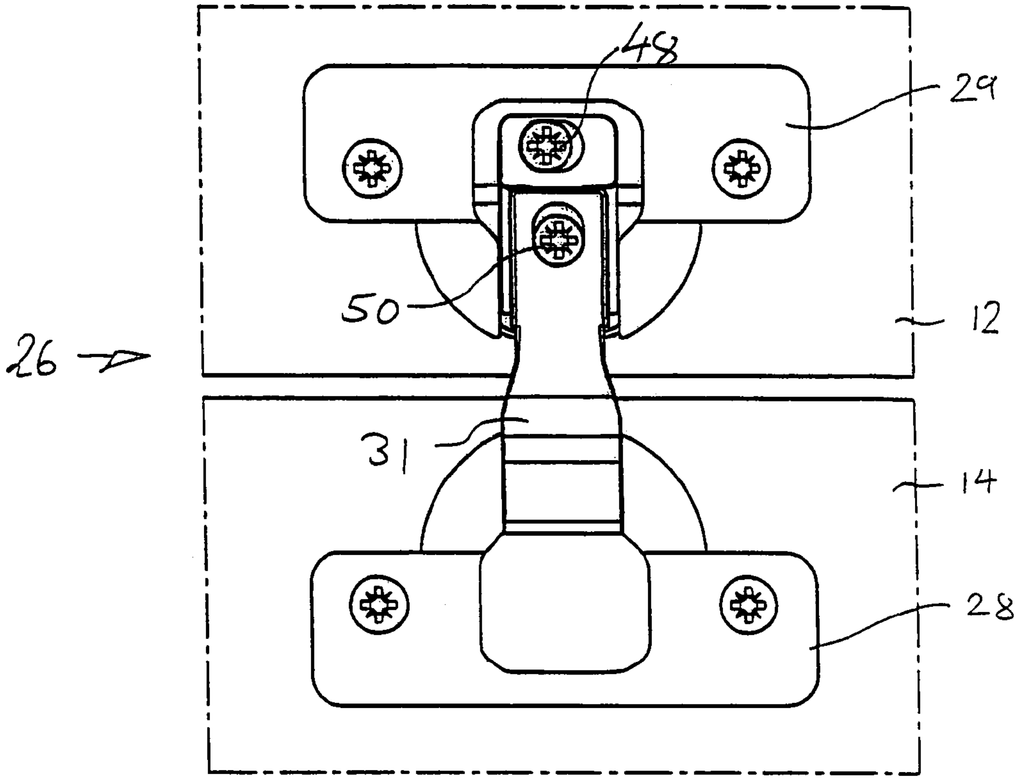
FIG. 3: a plan view of a hinge connecting the leaves of the folding flap to one another.

The folding flap 16 is shown in an open position in FIG. 2. The leaves 12 and 14 are upwardly pivoted such that the carcass is freely accessible.

The structure and the function of the hinge 26 will now be described in detail with respect to FIGS. 3 to 6.

Figure 4:
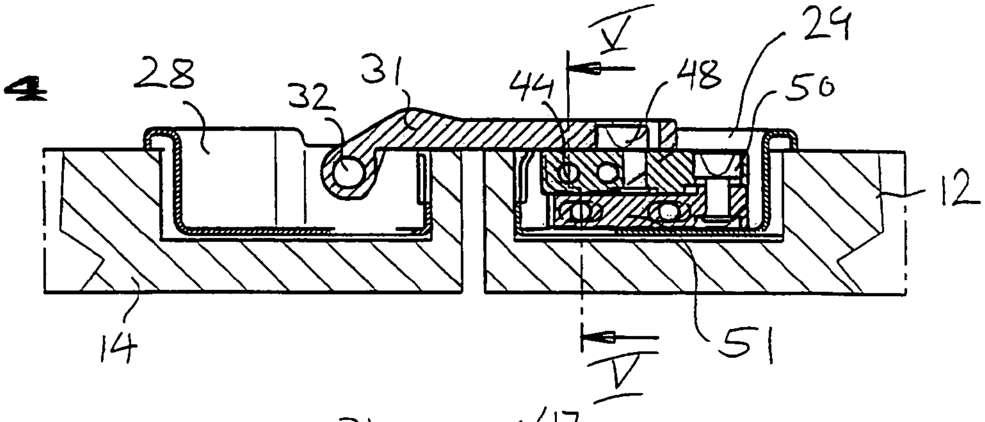
FIG. 4: a longitudinal section along the hinge in FIG. 3.
Figure 5:
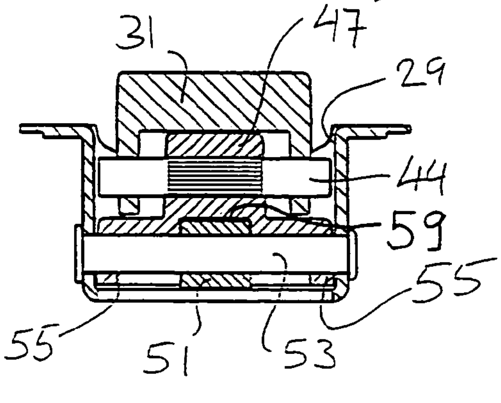
FIG. 5: a section along the line V-V in accordance with FIG. 4.
Figure 6:
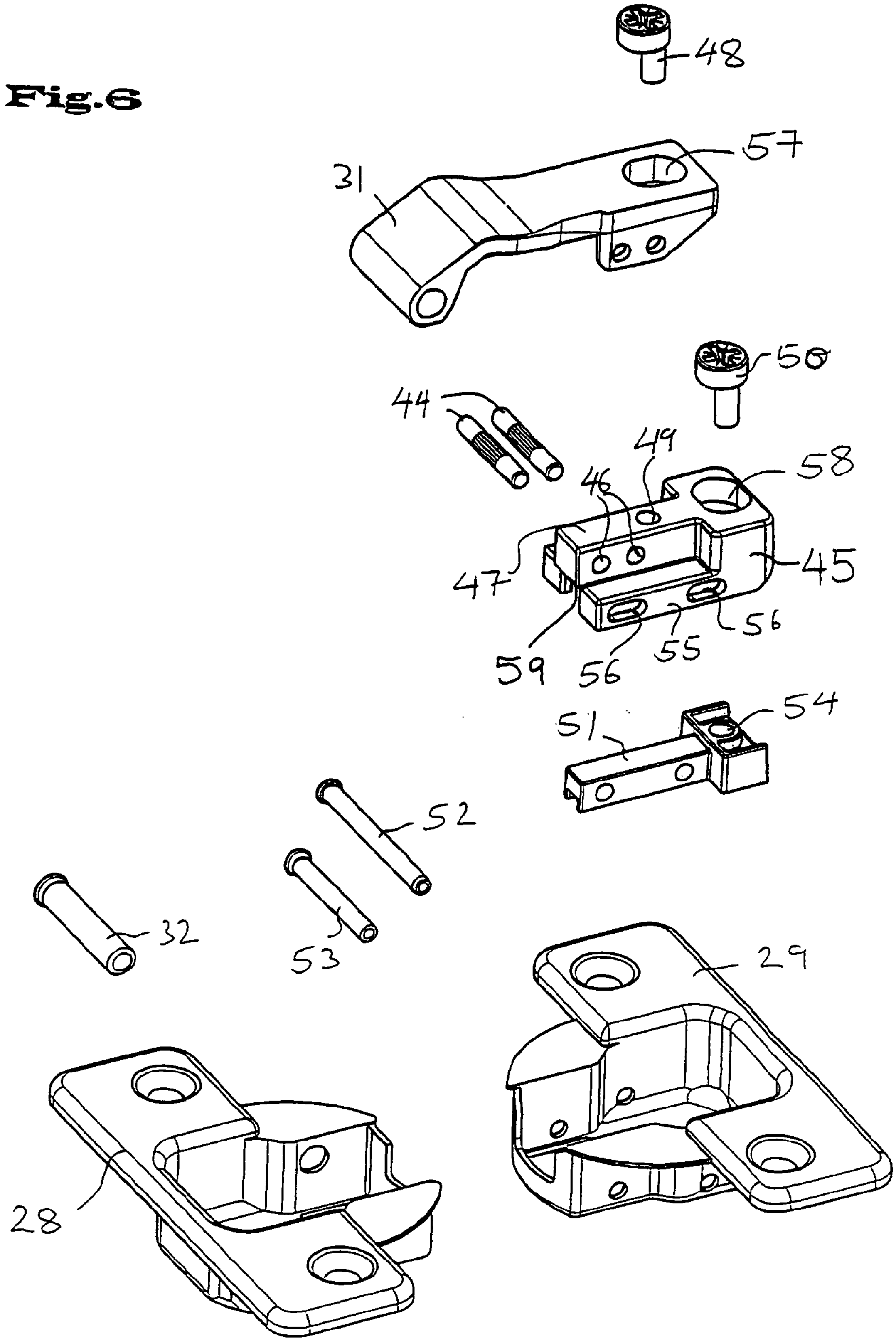
FIG. 6: an exploded representation of the individual parts of the hinge in accordance with FIG. 3.

The hinge arm 31 is pivotally connected to the first hinge cup 28 by a pin 32 (cf. FIG. 4). In the oppositely disposed end region, the hinge arm 31 is connected laterally displaceably to an intermediate plate 45 via two pins 44. The central region of the pins 44, which is provided with a fluting, is held in bores 46 of a narrow web part 47 of the intermediate plate 45 such that their lateral ends project out of them as spigots. The lateral displacement of the hinge arm 31 on the intermediate plate 45 is effected by an eccentric device 48 which passes through a bore 49 in the web part 47 and is riveted thereto.

In the embodiment shown, the intermediate plate 45 is guided via a separately provided support plate 51 which is fastened in the hinge cup 29 by two pins 52, 53. Provision is made for the hinge cup 29 to be made in a conventional manner from steel. A direct fastening of the eccentric device 50 in the hinge cup 29 would have required a more complex and/or expensive design of the cup from tin die casting.

The eccentric device 50 is held in a bore 54 of the support plate 51 and is riveted in it. The intermediate plate 45 has lateral limbs 55 such that it covers the support plate 51 in a U shape. The limbs have elongate holes 56 through which the intermediate plate 45 is held on the pins 52, 53 in the hinge cup 29 and is longitudinally displaceably guided, with the guide being formed by the same pins 52, 53 and by a lower groove 59 which partially encloses the upper side of the support plate 51 (cf. FIG. 5).

The hinge arm 31 and the intermediate plate 45 each have cut-outs 57, 58 in the usual manner for the heads of the eccentric devices 48 and 50.

The invention claimed is:

1. A lifting device for a two-leaf folding flap (16) whose upper leaf (12) is hinged to a top wall (22) or partition wall of a carcass around a horizontal first axis and whose lower leaf (14) is pivotally connected to the upper leaf (12) around a second axis parallel to the first axis, comprising at least one two-armed lever (34) which is pivotally mountable to a side carcass part around a horizontal pivot axis (40) and whose longer arm is hingedly connectable to the lower leaf (14), and at least one hinge arm (31) which is hingedly connected to the leaves (12, 14) and which is pivotally connected to a first hinge cup (28) arrangeable in the lower leaf (14) and is fastened in a second hinge (29) arrangeable in the upper leaf (12) in a firm but adjustable manner, wherein the hinge arm (31) is adjustable with respect to a hinge cup via a first eccentric device (48) in one direction and via a second eccentric device (50) in another direction perpendicular to the first direction, and the first eccentric device (48) and the second eccentric device (50) being substantially aligned in the another direction perpendicular to the first direction.

2. A lifting device in accordance with claim 1, wherein the hinge arm (31) is held with tolerance on an intermediate plate (45) via at least one pin (44) such that said hinge arm is adjustable via the first eccentric device (48) rotatably received in the intermediate plate (45).

3. A lifting device in accordance with claim 2, wherein the hinge arm (31), together with the intermediate plate (45), is adjustable with respect to the hinge cup (29) via a second eccentric device (50) passing through said intermediate plate.

4. A lifting device in accordance with claim 3, wherein the intermediate plate is longitudinally displaceably guided on a support plate (51) in which the second eccentric device (50) is also rotatably held.

5. A lifting device in accordance with claim 4, wherein the intermediate plate (45) has a web part (47) which is engaged over by the hinge arm (31) partially shaped in U shape in section.

6. A lifting device in accordance with claim 3, wherein the intermediate plate is longitudinally displaceably guided in the hinge cup (29) in which the second eccentric device (50) is also rotatably held.

7. A lifting device in accordance with claim 6, wherein the intermediate plate (45) has a web part (47) which is engaged over by the hinge arm (31) partially shaped in U shape in section.

8. A lifting device in accordance with claim 3, wherein the intermediate plate (45) has a web part (47) which is engaged over by the hinge arm (31) partially shaped in U shape in section.

9. A lifting device in accordance with claim 2, wherein the intermediate plate (45) has a web part (47) which is engaged over by the hinge arm (31) partially shaped in U shape in section.

10. A lifting device in accordance with claim 2, wherein the hinge arm (31), together with the intermediate plate (45), is adjustable with respect to the hinge cup (29) via the second eccentric device (50) passing through said intermediate plate.

11. A lifting device in accordance with claim 10, wherein the intermediate plate is longitudinally displaceably guided on a support plate (51) in which the second eccentric device (50) is also rotatably held.

12. A lifting device in accordance with claim 11, wherein the intermediate plate (45) has a web part (47) which is engaged over by the hinge arm (31) partially shaped in U shape in section.

13. A lifting device in accordance with claim 12, wherein the at least one pin (44) is held in the web part (47) such that it projects beyond the web part at both sides and can thereby displaceably receive the over-engaging hinge arm (31) transversely to the web part.

14. A lifting device in accordance with claim 10, wherein the intermediate plate (45) has a web part (47) which is engaged over by the hinge arm (31) partially shaped in U shape in section.

15. A lifting device in accordance with claim 10, wherein the intermediate plate is longitudinally displaceably guided in the hinge cup (29) in which the second eccentric device (50) is also rotatably held.

16. A lifting device in accordance with claim 15, wherein the intermediate plate (45) has a web part (47) which is engaged over by the hinge arm (31) partially shaped in U shape in section.

17. A lifting device in accordance with claim 16, wherein the at least one pin (44) is held in the web part (47) such that it projects beyond the web part at both sides and can thereby displaceably receive the over-engaging hinge arm (31) transversely to the web part.

18. A lifting device in accordance with claim 1, wherein the intermediate plate (45) has a web part (47) which is engaged over by the hinge arm (31) partially shaped in U shape in section.

19. A lifting device in accordance with claim 18, wherein the at least one pin (44) is held in the web part (47) such that it projects beyond the web part at both sides and can thereby displaceably receive the over-engaging hinge arm (31) transversely to the web part.

20. A lifting device in accordance with claim 19, wherein the at least one pin (44) is provided with a fluting in its middle region.

* * * * *